United States Patent [19]
Scholl

[11] 3,892,307
[45] July 1, 1975

[54] CONVEYOR HAVING ADJUSTABLE FLIGHTS

[75] Inventor: Howard O. Scholl, Louisville, Ky.

[73] Assignee: American Air Filter Company, Inc., Louisville, Ky.

[22] Filed: Sept. 5, 1972

[21] Appl. No.: 286,330

[52] U.S. Cl............................. 198/195; 432/137
[51] Int. Cl............................................ B65g 15/30
[58] Field of Search ............. 198/189, 195; 266/21; 432/137

[56] References Cited
UNITED STATES PATENTS

| | | | |
|---|---|---|---|
| 3,447,668 | 6/1969 | Jernigan | 198/195 |
| 3,674,130 | 7/1972 | Carmichael | 198/195 |

*Primary Examiner*—Edward A. Sroka

[57] ABSTRACT

An endless conveyor that is comprised of rotatably mounted transversely extending flights, the flights being adaptable for rotatable movement about the axis of the transversely extending flights.

2 Claims, 5 Drawing Figures

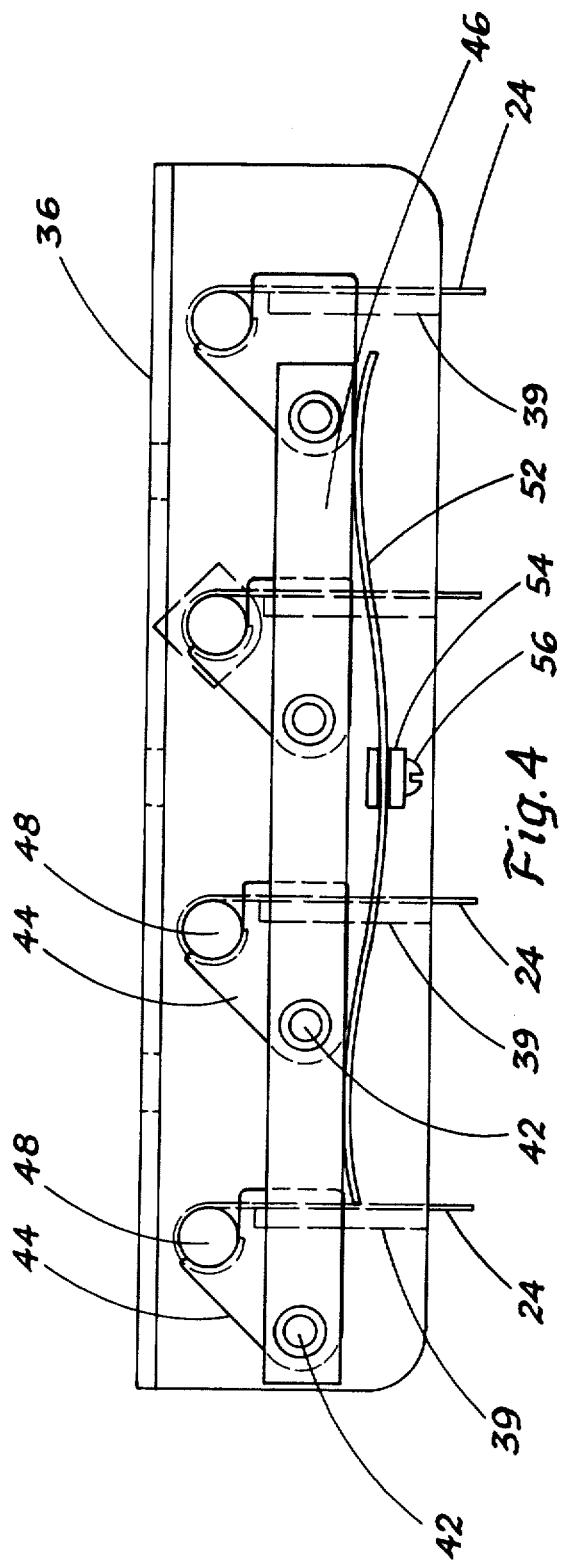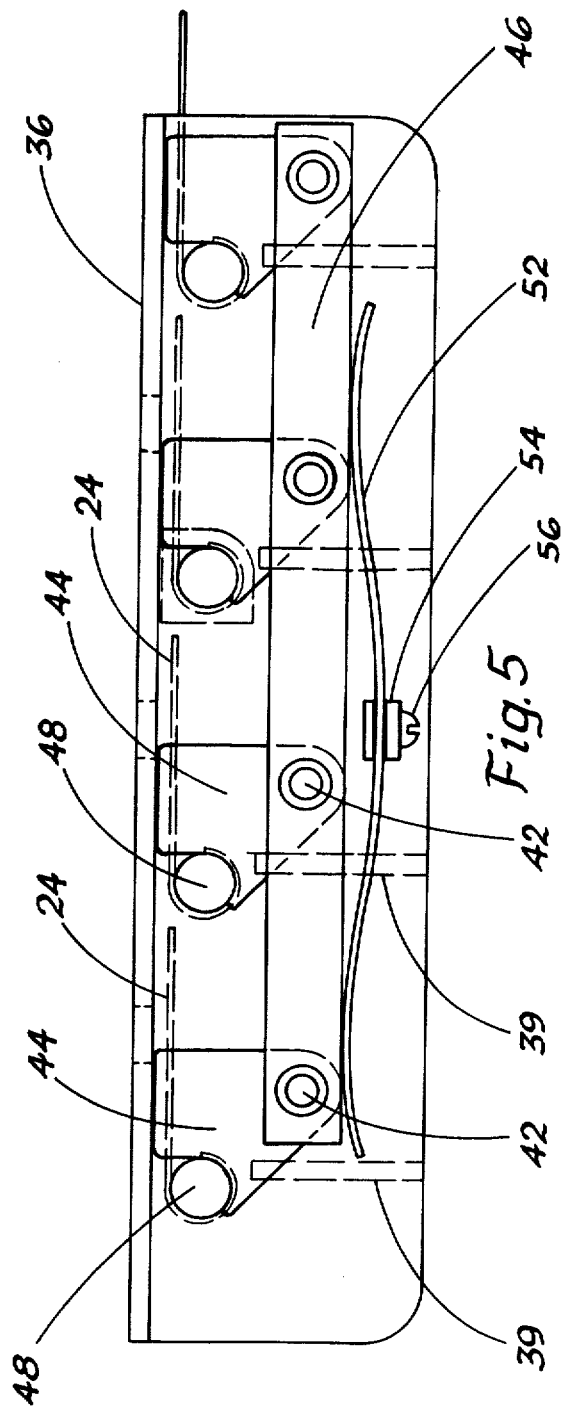

CONVEYOR HAVING ADJUSTABLE FLIGHTS

BACKGROUND OF THE INVENTION

This invention relates to conveyors having rotatably mounted flights and more particularly relates to conveyors utilized in the manufacture of fiberglas filters to which a heat hardenable liquid resin binder has been applied.

In the manufacture of fibrous containing filters which are utilized in gas streams for removal of particulate matter suspended in the gas stream, adhesive type materials are generally added to the fibrous strands whereby the particulate matter coming in contact with the filter during the filtering process adheres to the adhesive material and is removed from the gas stream. Many different types of adhesive materials at various concentrations are utilized in the manufacture of filters of the non-woven fibrous type, each particular adhesive at a given concentration being for a preselected use. In the preparation of fibrous containing filter media the most widely used material is one prepared from glass beads which involves collecting fibers produced by an attentuation of streams of molten glass onto a rotating drum until a desired thickness of mat is obtained; cutting the mat from the rotating drum and placing the mat on the moving surface of a conveyor; spraying a liquid resin upon the fibrous mat; transporting the mat through an oven in which it is subjected to heat to set the adhesive, and thereby bond the fibers together and consolidate the formed mat or blanket. The conveyors which are generally used in the heat treating operation have openings therein for allowing hot gases to circulate through the fibrous mat in setting the adhesives. Furthermore, since the uses to which these mats are to be subjected are different, different adhesives at various concentrations are required, in turn requiring different operating conditions in the heat treating operation. Many problems in relation to the operating conditions for the heat treating operation have evolved and been solved, but the varying of air flow rates through the fibrous material to be treated has not.

SUMMARY OF THE INVENTION

In the present invention, it is recognized that it is desirable to provide a conveyor adapted for use in the manufacture of nonwoven fibrous blankets. Furthermore, it is recognized that it is desirable to provide a conveyor having adjustable flights for changing the gas flow rate through a fibrous mat during the heat treating operation. Also, it is recognized that it is desirable to provide a conveying apparatus with adjustable flights which are easily and quickly operable.

The present invention advantageously provides a straightforward arrangement for a conveying apparatus adapted for use in the manufacture of fibrous blankets including adjustable flights, easily and quickly operable, for changing the flow rate of heat treating gases in the heat treating operation of fibrous mats.

Various other features of the present invention will become obvious to those skilled in the art upon reading the disclosure set forth hereinafter.

More particularly, the present invention provides a conveying apparatus comprising an endless loop of rotatably mounted transversely extending conveyor flights; means for moving the endless loop of rotatably mounted flights; and means for adjusting the rotatably mounted flights about their transversely extending axis.

It is to be understood that the description of the examples of the present invention given hereinafter are not by way of limitation and various modifications within the scope of the present invention will occur to those skilled in the art upon reading the disclosure set forth hereinafter.

Referring to the drawing:

FIG. 4 is an enlarged elevational view of the conveying apparatus showing the flights in a maximum gas flow through position; and, FIG. 5 is an enlarged elevational view of the conveying apparatus showing the flights in a minimum gas flow-through position.

Figure 1:
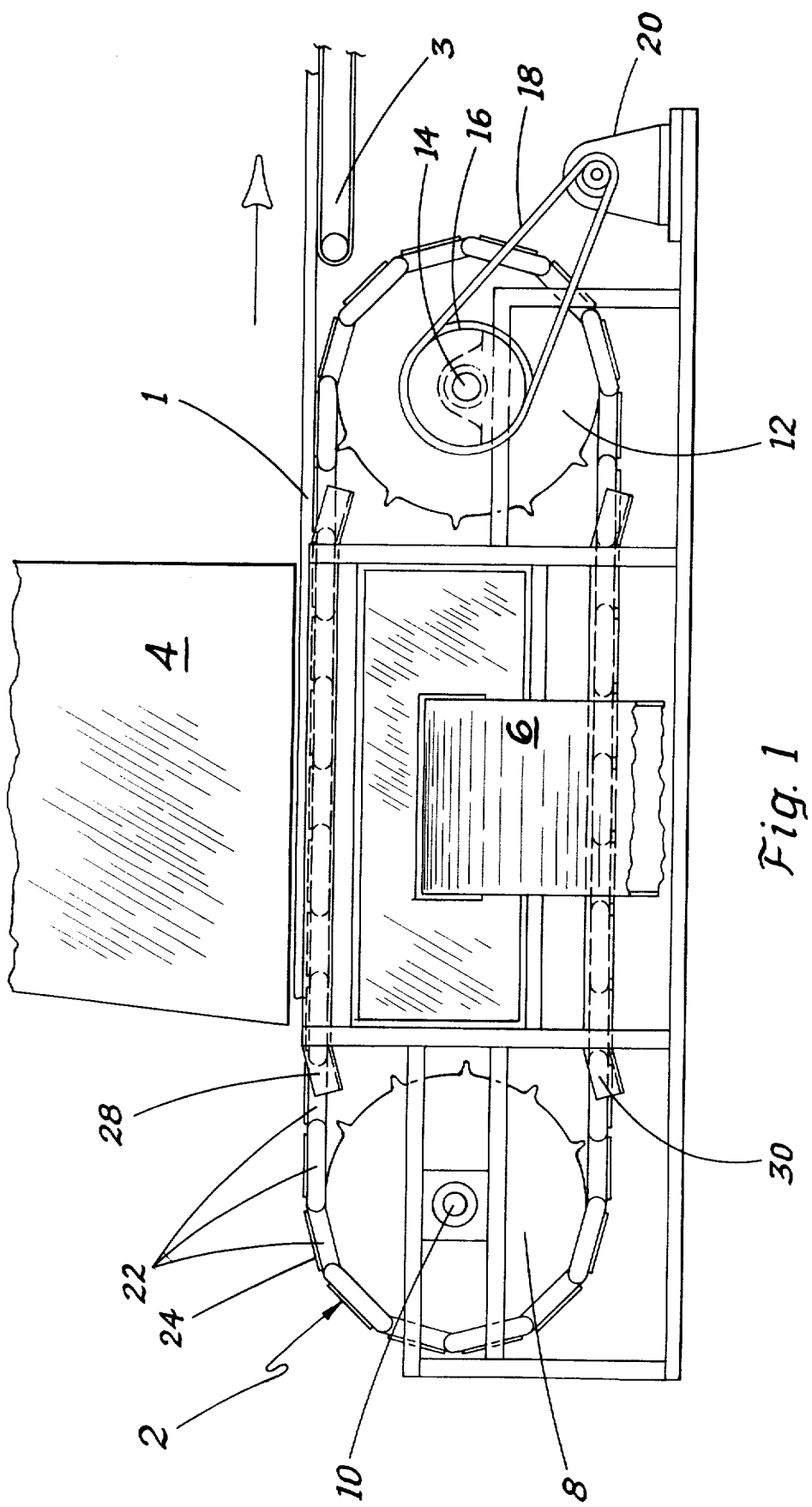
FIG. 1 is a somewhat diagrammatic elevational view of a conveying apparatus of the present invention including a heat treating oven and moving means for a heat treating gas.

FIG. 1 of the drawing illustrates the conveying apparatus of the present invention in combination with a heat treating oven 4 and a heat treating gas moving means including a suction box 6 with an air blower means (now shown) therein. A fibrous blanket 1 is shown being moved by the conveyor to the heat treating oven 4 wherein adhesive which has previously been added to the blanket is subjected to heat treating conditions. A secondary conveyor 3 may be utilized to carry the treated blanket away from the conveyor 2 to a point for further treatment or use.

A sprocket shaft 14 is provided toward one end of the conveyor 2, shaft 14 carrying a pair of spockets 12, only one being shown. The shaft 14 is adapted to be driven by a sprocket 16 cooperating with a chain 18 which is driven by a suitable motor 20. At the opposite end of the apparatus, a shaft 10 is provided, shaft 10 carrying a pair of spaced sprockets 8, only one being illustrated.

Conveyor 2 further includes links 22 pivotably connected in two series, one series being shown, the other series being located on the opposite side of the conveyor. Links 22 form an endless belt and are adapted for engagement with the teeth on the sprockets 8 and 12. Links 22 are further adapted to ride upon tracks 28 and 30, tracks 28 being toward the edges of the upper run of the conveyor and tracks 30 being toward the edges of the lower run of the conveyor. The tracks 28 and 30 may be conveniently made from angle iron as illustrated in FIG. 2.

Figure 2:
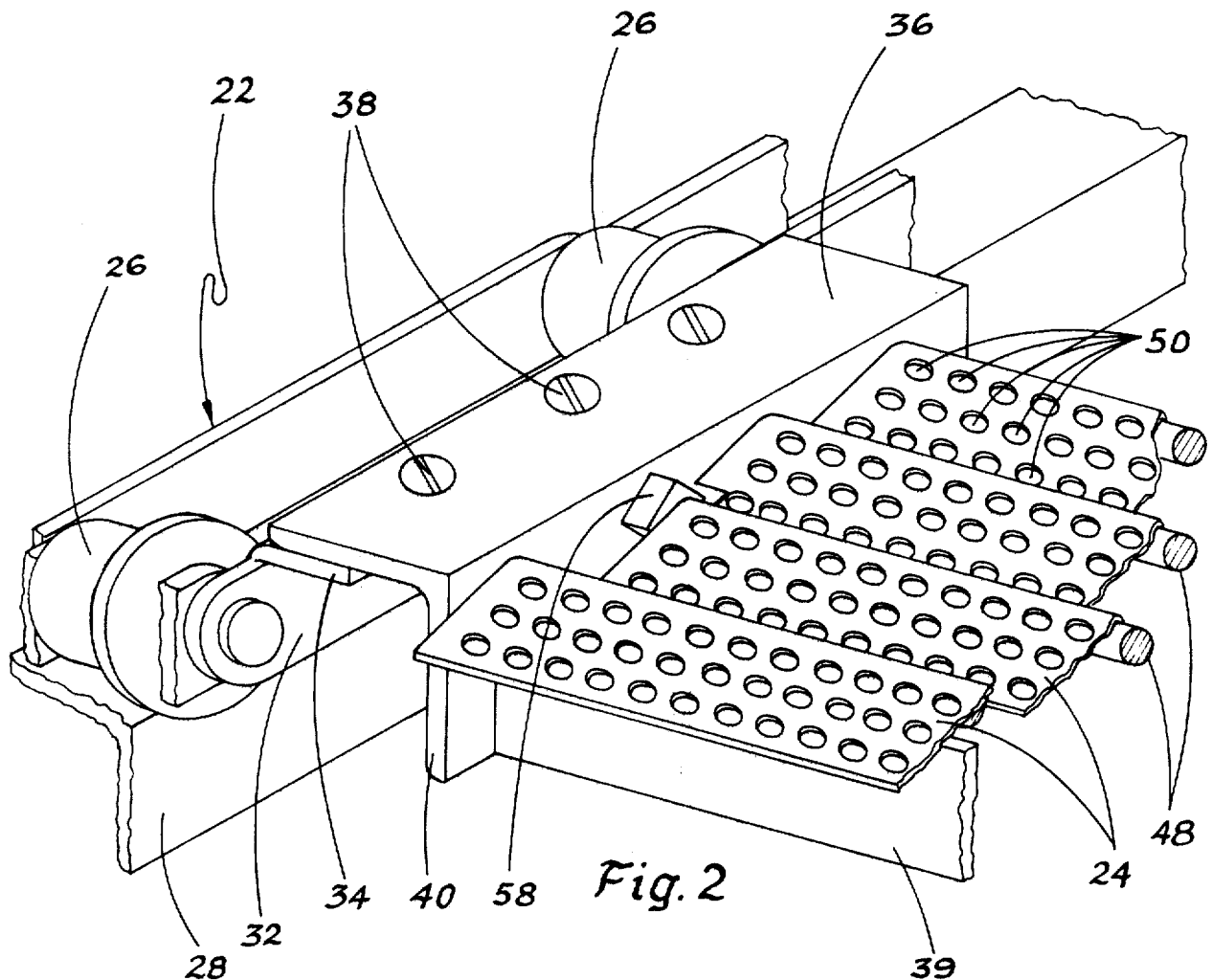
FIG. 2 is an enlarged perspective view, partially cutaway, showing a segment of an endless loop of conveyor flights of the present invention.
Figure 3:
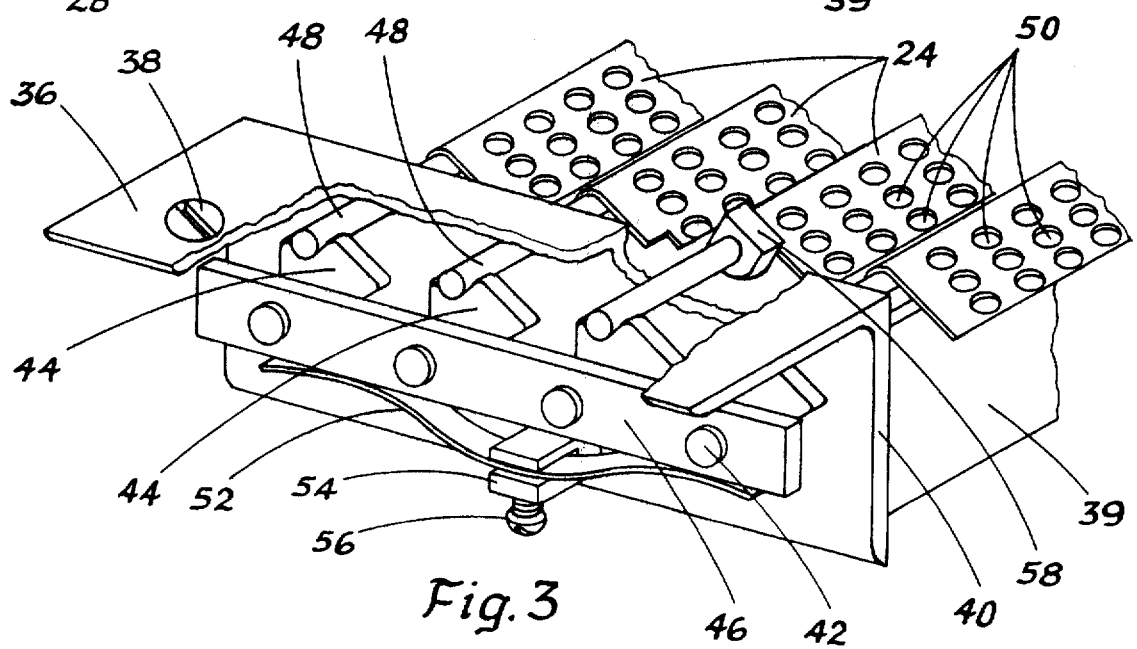
FIG. 3 is an enlarged perspective view with selected portions in cutaway showing the means for positioning the flights.

In FIG. 2 the pairs of links 22 at each side of the conveyor are interconnected by rollers 26, rollers 26 being adapted to ride upon the tracks 28 and 30. Each link 22 is formed from two elongated members, outer member 31 and inner member 32, with the rollers 26 being disposed therebetween. Inner member 32 includes an inwardly extending ledge 34 adaptable for receiving an L-shaped support member 36 thereon, L-shaped support member 36 being attached to the elongated member 32 by bolt means 38. Support member 36 includes a vertically extending leg portion 40 with apertures (not shown) therein for receiving transversely extending shaft members 48 therethrough for rotatable movement therein. Transversely extending shaft members 48 extend across the conveyor 2 and are rotatably mounted in a corresponding vertically extending leg 40 (not shown) of a support member 36 (not shown). Fixedly attached to each transversely extending shaft member 48 is a conveyor flight 24, conveyor flight 24 being adaptable for movement about the axis of transverse member 48.

Each shaft member 48 is fixedly attached at generally one end to one end of a crank member 44. Fixedly attached at generally the opposite end of the crank member 44 is a cylindrical rotatable member 42. Member 42 is also rotatably mounted to a longitudinally extending bar member 46 whereby sliding movement of bar member 46 rotates transversely extending shaft member 48 including conveyor flights 24.

Flights 24 include apertures 50 therein for the passage of heat treating gases or air therethrough. Fixedly attached to vertical extending leg 40 is a plurality of stop members 39, stop members 39 being positioned generally beneath each transverse member 45 and in alignment therewith. Stop members 39 are adapted to communicate with flights 24 (FIG. 4) to maintain flights 24 in a selected stationary generally vertical position.

A spring 52 is provided for resiliently supporting slidably mounted longitudinal extending bar 46 thereon, spring 52 being supported by C-shaped member 54, C-shaped member 54 being fixedly attached to the vertical extending leg 40. Support member 54 includes a threaded opening therein (not shown) for receiving bolt means 56 therethrough, bolt means 56 being provided for preventing movement of the spring 52 through the mounting slot of the C-shaped member 54. Spring 52 being stationarily mounted for receiving bar 46 in slidable relation thereon is an overcenter device as shown in FIGS. 4 and 5 depending upon the position of bar 46.

FIGS. 4 and 5 illustrate the position of flights 24 in a fully open position (FIG. 4) for a maximum gas flow-through condition, and a fully closed position (FIG. 5) for a minimum gas flow-through condition. Position of flights 24 may be adjusted to positions other than those illustrated by movement of adjusting bar 46 at some preselected distance between the positions illustrated in FIGS. 4 and 5.

In the illustrated example, slidable movement of one longitudinal extending bar 46 pivotably moves four flights 24. It is realized that more or less than four flights 24 may be attached to one bar 46. Further, on every fourth transversely extending rod 48 is a turning member, such as, nut 58. Nut 58 is shown as welded to the member 48 and is mounted whereby upon turning the nut 58 crank member 44 moves bar 46 horizontally which simultaneously therewith moves the remaining crank members 44 which are attached to a common bar 46. In turn, flights 24 in communication with the moving crank members 44 are moved from one position to another. Nut 58 may also be adaptable for screw engagement with transversely extending rod 48 for locking a bar 46 in a preselected position with the angular position of the flights 24 being dependent upon the longitudinal position of the bar 46. In this case, tightening of nut 58 against the vertical extending leg portion 40 prevents movement of the longitudinally extending bar member 46 thereby locking the flights 24 which are in communication with the bar 46 at a preselected angular position through crank member 44. In the present example, the nut 58 is fixedly attached to member 48 and the flights 24 are adaptable for only two positions, fully open or fully closed. In this example, rotating the nut 58 90° changes the position of the flights.

When it is desired to change products which will be conveyed by the conveying apparatus of the present invention and it is desired to increase or decrease the gas flow-through the conveyor, nut 58 is rotated 90° sliding longitudinal extending adjusting bar member 46 from one position to another. In one position, spring 52 presses the crank 44 against angle 36 holding the flight 24 in a horizontal position and when crank 44 is rotated 90°, spring 52 holds flight 24 against stop member 39.

It will be realized that various adjusting mechanisms may be utilized in order to change the position of the transversely extending flights as well as other changes which may be made to the specific embodiment shown and described without departing from the present invention.

What is claimed is:

1. A conveying apparatus comprising: (a) an endless loop of rotatably mounted transversely extending conveyor flights; (b) means for moving said endless loop of rotatably mounted flights; and, (c) crank means for adjusting the rotatably mounted flights about their transversely extending axis, said crank means being attached at one end to a transversely extending flight and a longitudinally extending slidable member at the opposite end, the angular position of said flights being determined by the slidable movement of said longitudinally extending member.

2. The conveying apparatus of claim 1, said means for adjusting said rotatably mounted flights being a turn member fixedly attached to one transversely extending flight whereby upon rotation of said turn member said flight rotates simultaneously therewith.

* * * * *